Dec. 13, 1960   T. P. DE PARAVICINI   2,963,879
COOLING OF CABINS OR OTHER HABITABLE PARTS OF AIRCRAFT
Filed April 30, 1956   2 Sheets-Sheet 1
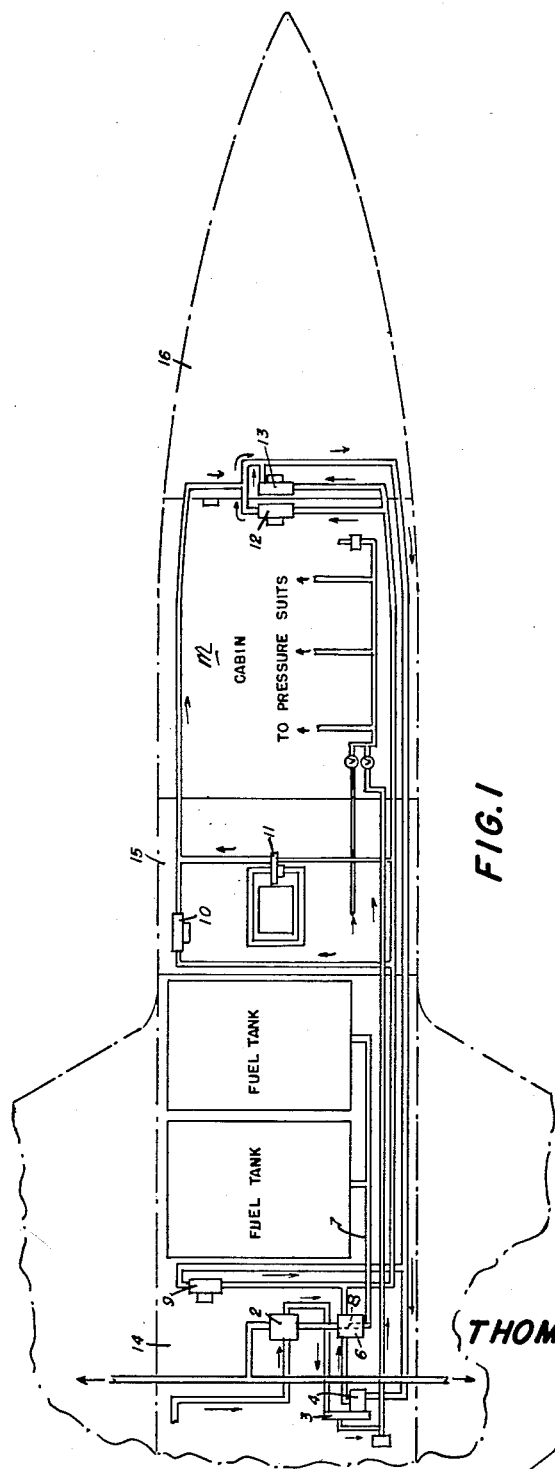
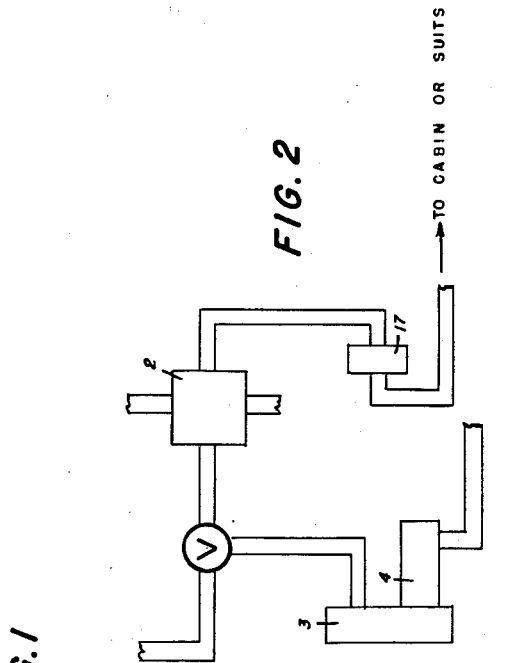
INVENTOR
*THOMAS PITT DE PARAVICINI*
ATTORNEYS Dec. 13, 1960 T. P. DE PARAVICINI 2,963,879
COOLING OF CABINS OR OTHER HABITABLE PARTS OF AIRCRAFT
Filed April 30, 1956 2 Sheets-Sheet 2

INVENTOR
THOMAS PITT DE PARAVICINI

ATTORNEYS

United States Patent Office 2,963,879
Patented Dec. 13, 1960

2,963,879

COOLING OF CABINS OR OTHER HABITABLE PARTS OF AIRCRAFT

Thomas Pitt De Paravicini, Yeovil, England, assignor to Normalair Limited, Yeovil, England Filed Apr. 30, 1956, Ser. No. 581,670

Claims priority, application Great Britain May 2, 1955

4 Claims. (Cl. 62—239)

This invention relates to the cooling of cabins or other habitable parts of aircraft and particularly, though not exclusively, to aircraft intended to be flown at very high supersonic speeds and high altitudes.

An object of the present invention is to provide systems of cooling aircraft incorporating apparatus of comparatively light weight.

The present invention briefly consists in a cooling system for aircraft comprising a closed refrigeration system, and a supply of air under pressure which is caused to pass through an air turbine driving a compressor in the refrigeration system, cooled air from the air turbine being available for use as desired, e.g. for pressurising a habitable space in the aircraft and for supply to pressurised suits for the occupants thereof.

Fig. 1 is a diagrammatic view of one form of the invention.

Fig. 2 is a fragmental view of a further embodiment of the invention and,

Figure 3:
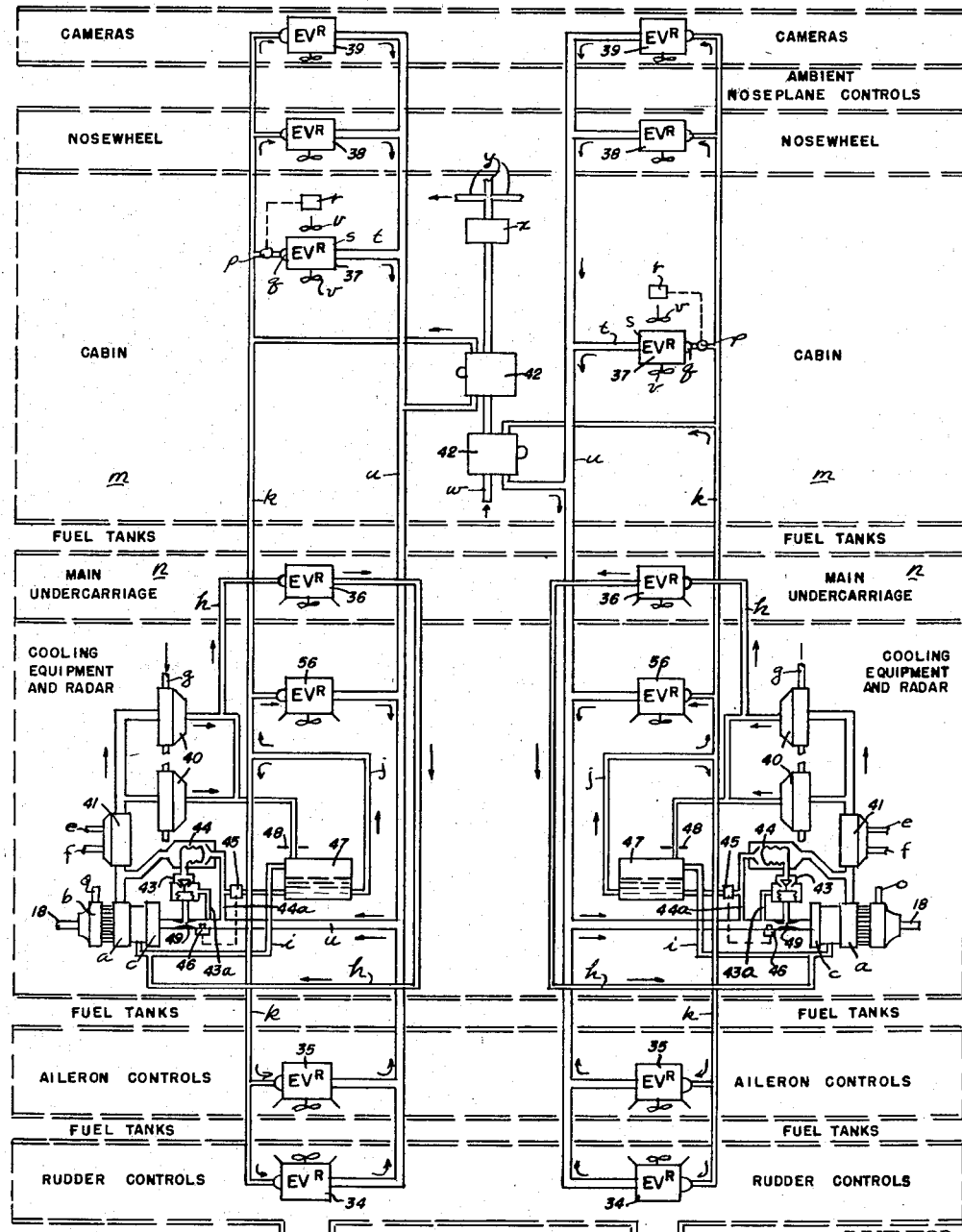
Fig. 3 is a diagrammatic view of a form of the invention for cooling large supersonic aircraft.

In one arrangement embodying the present invention illustrated in Figure 1 of the drawings, air obtained from an aircraft engine is adapted to be partially cooled by means of a heat exchanger 2, and this partially cooled air is then fed to an air turbine 3 driving a Freon gas compressor 4 of multistage centrifugal fan type running at low tip speed, e.g. at 25,000 r.p.m. with 4-inch rotors. In passing through the turbine the air is further cooled by expansion and is then fed to the aircraft cabin 5 for pressurising or is fed to prescribed suits worn by the occupants.

The compressed Freon gas flows to a condenser 6 where it gives up heat to the engine fuel flowing through pipes 7 by way of a further heat exchanger 8 prior to the fuel entering the heat exchanger 2. The liquified Freon gas then passes to a plurality of evaporators 9, 10, 11, 12 and 13 each furnished with a motor driven fan.

The evaporator 9 is disposed in compartment 14, the evaporator 13 is disposed in compartment 16, the evaporators 10 and 11 are disposed in compartment 15 whilst the evaporator 12 is disposed in the cabin 5 and air from its space is circulated over each evaporator.

The liquid Freon after regasification is returned to the compressor 4 in a closed circuit.

The temperature rise of the fuel in passing through heat exchangers 8 and 2 is not great but if really cold fuel is required by the engines for oil cooling it is practical to divide the fuel into two streams, one of say ⅔ of the total flow which receives heat from the Freon condenser and another of say ⅓ of the total flow which passes direct to the engine oil cooler. If necessary this smaller stream can be refrigerated by the Freon system.

The weight of the air turbine and Freon compressor unit, with condensers, evaporators, air circulating fans etc. may be considerably lighter than the air-cycle systems at present known.

In an alternative arrangement illustrated in Figure 2, the air from an engine is divided into two streams, one passing direct to the air turbine 3 driving a refrigerant compressor 4 and the other passing through a heat exchanger 2 and a second air turbine 17, the air from the air turbine 3 being exhausted to atmosphere through the jet nozzle of an aircraft or in any other suitable way. The cooled air from the second air turbine 17 is conveyed to the aircraft cabin or pressure suits or is used for any other desired purpose. The cold air from the first air turbine may be used for some form of cooling before ejected to atmosphere.

In a further arrangement illustrated in Figure 3 of the accompanying diagrammatic drawings for the cooling of a large supersonic aircraft, the system is duplicated for safety and each half of the duplicated system consists of a two stage centrifugal refrigerant compressor operating at constant mass flow and temperature through its first stage and driven by an air turbine operating on nearly a constant mass flow of pressure air.

Air tapped from one or more of the engine compressors is admitted through a pipe $o$ to each turbine $b$ and is discharged through pipe 18 to a rearwardly pointing thrust nozzle (not shown). A two-stage refrigerant compressor $c$, $d$ is designed to absorb nearly constant power from each turbine $b$ and the pressure drop of the air across the turbines can be chosen to be a suitable fraction of the engine compressor pressure under cruising conditions so that the remaining pressure drop in the exhaust or thrust nozzle is sufficiently high to give an exhaust velocity of the same order or slightly higher than the aircraft flight velocity, thus giving the optimum efficiency of the engine and auxiliary power system when considered as a whole.

For ground testing, the turbines $b$ can be driven by compressed air supplied by a ground truck when it is not otherwise desired to run one of the aircraft engines.

Each refrigerant circuit consists of a main circuit with several other circuits superimposed upon it. Considering firstly the main circuit, high pressure hot gas from the second compressor stage $d$ passes first through a heat exchanger 41 which is inoperative in flight but which becomes a condenser for operation on the ground when supplied with cooling water by pipes $e$, $f$ from a ground truck. It then passes through two condensers 40 in parallel, each of which is cooled by the fuel supply to one or more of the aircraft engines entering by pipe $g$. The fuel and refrigerant passages in these two heat exchangers 40 are so arranged that after condensing is complete the condensate is cooled to near the inlet temperature of the fuel. The partially cooled condensate, still at sensibly 2nd compressor stage pressure, then divides into two streams, the smaller flow feeding what for simplicity is called the high level liquid line $h$ and the larger flow passing through an expansion valve 48 into a reservoir chamber 47, in so doing a small fraction of the liquid being evaporated and further cooling the remainder.

In the reservoir chamber 47 the flash gas formed in dropping the pressure of the condensed liquid entering the chamber separates out and is bled by pipe $i$ from the top of the chamber to the inlet of the 2nd compressor stage $d$. The reservoir chamber is therefore sensibly at first stage outlet pressure or 2nd stage inlet pressure which is the same thing.

From the bottom of the reservoir chamber 47 the liquid flows by pipe $j$ into what may best be called the low level liquid line $k$.

The aircraft contains a large number of compartments each containing gear or apparatus of some kind which has to be kept below a certain temperature limit whatever the skin temperature of the aeroplane. For instance the cabin compartment $m$ has to be cooled to a low temperature limit. In this compartment a refrigerant evaporator 37 or cold radiator is provided fed from the low level liquid line k. In the branch pipe feeding the evaporator 37 are two expansion valves p, q in series. The first of these is controlled by the cabin temperature and damped in known manner by a temperature sensing element r positioned in the air outlet duct s from the evaporator. The second expansion valve q is normally open but is controlled by a combination of temperature and pressure in the refrigerant gas line leaving the evaporator 37. As long as there is a small degree of superheat in this gas line the second valve q remains open but should the cooling demand become too high for the evaporator so that it becomes flooded or nearly so, then as the outlet pressure and temperature approach the saturation line for the gas the second valve q commences to close and thus prevents excess liquid from passing through the evaporator into the gas outlet which is connected by pipe t to the low level gas return pipe u. This low level gas return pipe returns the gas to the inlet of the first stage compressor c.

Other compartments of the aircraft such as n contain components such as undercarriages with high temperature cooling limits. In some of these are installed evaporators or cold radiators such as 36 similar to those in the cabin but fed with liquid refrigerant from the high level liquid line h and returning the gas via the high level gas return line to the inlet of the 2nd stage d of the compressor. Other components instead of being cooled by air circulating in a compartment which is in turn cooled by an evaporator or cold radiator may be direct cooled by having boiling refrigerant jackets around them. In general high temperature components are cooled by evaporators or boilers drawing liquid from the high level line and returning the gas via the high level return line to the inlet of the 2nd stage compressor d and low temperature components are cooled by evaporating liquid, for example in evaporators 34, 35, 36, 37, 38, 39 and 56, from the low level liquid line k and returning the gas by the low level gas return line u to the inlet of the first stage compressor c. Where economy in pipe length is desired, the high level pipes may not run the entire length of the aircraft and some high temperature components may be cooled by low level refrigerant.

In the low level gas return line u near the inlet of the first compressor stage c, a temperature sensitive element 46 is provided controlling a valve 45 between the low level liquid and gas return line u and also in the low level gas return line u near to the inlet of the first stage compressor c is a venturi 49 from which pressure tappings control valves 43 and 44 which admit a by-pass flow of gas from the 2nd stage compressor outlet to the low level gas return line u. The operation of this secondary part of the aircraft is as follows:

If one of the duplicated refrigeration systems is out of action and the other system is working at full capacity, then the whole of the gas discharged from the compressor d is condensed by the heat exchangers 40, the liquid flowing along high level line h and low level line k to the various evaporators whence it returns as a gas along the high and low level lines h and u to the compressor inlet. During these conditions venturi 49 senses a large pressure difference between its inlet and throat, this pressure acting on the bellows within a valve 43, keeping the latter closed.

Gas from the inlet side of the venturi 49 passes into the valve 43 via a duct 43a and from thence into the interior of the bellows of valve 44, the pressure within these bellows building up and keeping the valve member on its seat and thus preventing gas from the compressor passing into by-pass line 44a. The bellows of valve 44 has a small orifice formed therein in order to allow high pressure gas therein to escape in the valve housing 44.

If both systems are working normally, and full cooling capacity is not required from each, venturi 49 senses a small difference in pressure, allowing the bellows within the valve 43 to expand and thus open the valve 43. High pressure gas present within the bellows of valve 44 escapes through the orifice formed therein to the valve housing 44, allowing the bellows to contract and open valve 44. Gas from the compressor then enters the by-pass line 44a to return to the 1st stage of the compressor.

The temperature of the gas may be regulated by element 46 which controls the opening of the liquid valve 45.

The mass flow of air passing through turbine b may be regulated by suitable means (not shown), this will ensure that the compressor will be run at its most efficient speed to suit all refrigeration conditions.

In the aircraft compartments such as the cabin compartment m the evaporator 37 consists of a finned tube assembly fitted with two fans v mounted direct on the shafts of two high speed electric motors. One such motor and fan v is positioned downstream of the cooler and runs continuously when cooling is required. The other on the upstream side of the cooler is controlled by a pressure sensitive switch (not shown) and comes into action only when the air pressure in the compartment in which this cooler is situated falls below some predetermined figure such as for instance 2 lbs. per sq. in.

In addition to the air tapped from the aircraft engine for driving the refrigerant compressor b a smaller quantity of air is used for pressurising the various aircraft compartments. This air is tapped separately from one or more engines and is limited in quantity by a constant flow valve.

It is first cooled by passing through a heat exchanger through the other side of which engine fuel is pumped. It then divides into a number of streams. Some of these streams feed rear compartments of the aircraft at comparatively low pressure. The remainder of this air is ducted to the front of the aircraft where it divides into further streams supplying the front compartments and the pressure suits for the crew. Air for the pressure suits is admitted through pipe w and then passes through heat exchangers 42 in which liquid refrigerant from pipe k is gasified. This cools the air to a low temperature approaching freezing point. After cooling the free water in the air is collected in a water separator x and drained off. From the water extractor the air duct branches to supply the pressure suits connected at points y. Fitted in each of these ducts is an electric heater thermostatically controlled to a temperature adjustable by the crew member concerned.

I claim:

1. The combination with an aircraft having a cabin space and a plurality of compartments, means associated therewith for cooling the air present in said space and compartments, such cooling means comprising a refrigerant compressor in one of said compartments, an air turbine driving said compressor, means defining a closed refrigeration path wholly within the cabin space and compartments operably connected to said compressor, a plurality of evaporators in said refrigeration path, one of said evaporators being located within the cabin space and the remainder of said evaporators being individually disposed in the respective compartments, means in the cabin space and each compartment operably associated with the evaporator in the cabin space and each compartment for passing air present in the cabin space and each compartment over the evaporators to reduce the temperature of the air, a supply of air under pressure, means passing the air under pressure through the air turbine and conduit means leading from the air turbine to said cabin space for allowing the cooled air passing therethrough to be used for pressurizing purposes.

2. The combination as claimed in claim 1, including a heat exchanger located intermediate the supply of air and the turbine through which the air passes prior to entry into the turbine.

3. The combination as claimed in claim 2, in which said compressor is a two-stage compressor, a further heat exchanger operably connected to the second stage of the compressor and means for supplying cooling water to said further heat exchanger when the aircraft is not in flight whereby said further heat exchanger functions as a condenser.

4. The combination with an aircraft having a cabin space and a plurality of compartments, means associated therewith for cooling the air present in said cabin space, said cooling means comprising a two-stage refrigerant compressor located in one of the compartments, an air turbine driving said compressor, a supply of air pressure, means passing the air pressure through the air turbine, conduit means leading from the air turbine to said cabin space to allow the cooled air passing therethrough to be used for pressurizing purposes, means defining a closed refrigeration path wholly within the cabin space and compartments operably connected with said two-stage compressor, a plurality of evaporators in the refrigeration path, one of said evaporators being within the cabin space and the remainder being individually disposed in the respective compartments, means in the cabin space and each compartment operably associated with the evaporators in the cabin space and compartment for passing air present in the cabin space and each compartment over the evaporators to reduce the temperature of the air, and the compartments requiring a low temperature returning the refrigerant through the refrigeration path to the first stage of the compressor and the compartments requiring a higher temperature returning the refrigerant in the closed refrigeration path to the second stage of the compressor.

References Cited in the file of this patent

UNITED STATES PATENTS

| | | |
|---|---|---|
| 2,098,558 | Anderson | Nov. 9, 1937 |
| 2,127,539 | Smith | Aug. 23, 1938 |
| 2,136,969 | Downey | Nov. 15, 1938 |
| 2,210,896 | Brush | Aug. 13, 1940 |
| 2,345,204 | Lodwig | Mar. 28, 1944 |
| 2,398,655 | Mayer | Apr. 16, 1946 |
| 2,473,496 | Mayer | June 14, 1949 |
| 2,479,128 | Maniscalco | Aug. 16, 1949 |
| 2,514,792 | Philipp | July 11, 1950 |